G. A. DARBY.
ROLLER BEARING.
APPLICATION FILED AUG. 25, 1920.
1,438,749.
Patented Dec. 12, 1922.
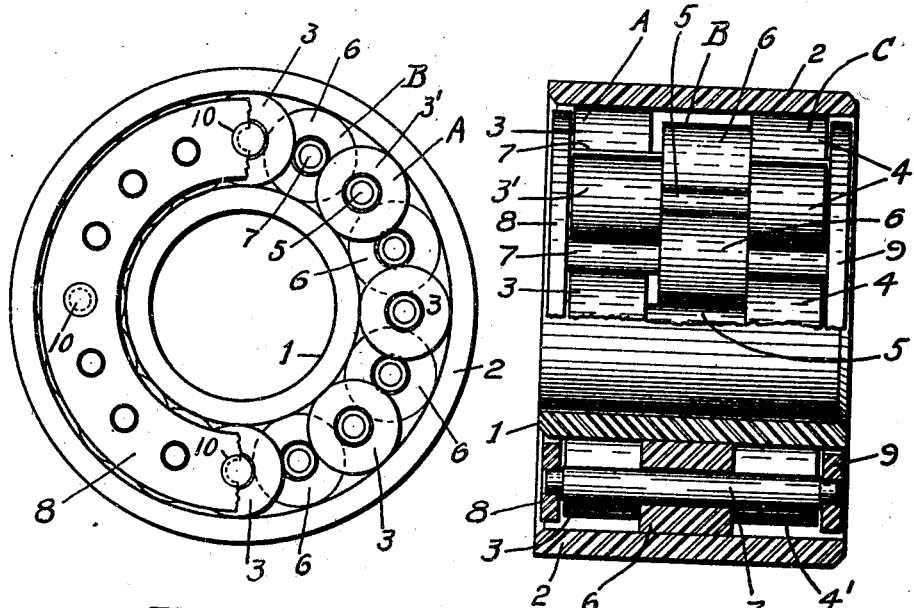
Fig. 2
Fig. 1
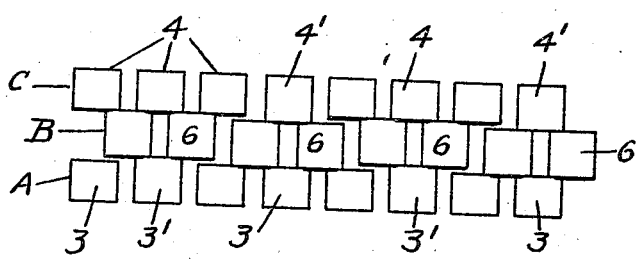
Fig. 3
INVENTOR
George A. Darby.
BY
William A. Hardy.
his ATTORNEY Patented Dec. 12, 1922.

1,438,749

UNITED STATES PATENT OFFICE.

GEORGE A. DARBY, OF EAST ORANGE, NEW JERSEY, ASSIGNOR TO THE HART ROLLER BEARING COMPANY, OF ORANGE, NEW JERSEY, A CORPORATION OF NEW JERSEY.

ROLLER BEARING.

Application filed August 25, 1920. Serial No. 405,349.

*To all whom it may concern:*

Be it known that I, GEORGE A. DARBY, a citizen of the United States, and a resident of East Orange, in the county of Essex and State of New Jersey, have invented certain new and useful Improvements in Roller Bearings, of which the following is a description.

My invention relates to roller bearings employing a plurality of series of cylindrical or conical rollers, and more particularly, though not exclusively, to roller bearings of the type disclosed in Patent No. 1,205,449, granted November 21, 1916 to Orlando W. Hart.

A roller bearing such as described in said patent comprises a plurality of adjacent annular series of cylindrical rollers disposed between and in rolling engagement with relatively rotatable inner and outer cylindrical bearing members. The rollers of each series are of equal length, and the corresponding rollers in alternate series are mounted on cylindrical aligning shafts or spacing rollers, the arrangement being such that the rollers and shafts of each series respectively coact with the shafts and rollers of each adjacent series so as to maintain the rollers of adjacent series in staggered relation and to maintain the rollers of each series in proper spaced relation, preventing the collapsing of the same. When a bearing of this character, or any bearing comprising a plurality of adjacent series of rollers and in which the rollers of each series are of equal length, is in use, especially if subjected to heavy loads, ridges corresponding to the slight spaces between adjacent series of rollers are apt to be formed by the rollers on the opposed surfaces of the spaced bearing members, between the bearing tracks of the respective series of rollers. As the operation of the bearing is continued, the metal forming these ridges is apt to be worn or broken off from the bearing members, with consequent danger of the presence of loose pieces of metal in the bearing. The presence of such pieces of metal in a bearing will, of course, cause a great loss in efficiency, and may even result in such breakage or damage to the parts of the bearing as to render the latter entirely useless.

The principal object of my invention is to provide an improved construction for roller bearings, especially those of the type disclosed in Patent No. 1,205,449 referred to above, whereby the objections just described will be obviated.

My invention further resides in the construction of parts and combinations of elements hereinafter more fully described and claimed.

For a clearer understanding of my invention, attention is directed to the drawing accompanying and forming a part of this specification, and in which:

Figure 1 is a view in side elevation, partly broken and partly in section, of one form of roller bearing in accordance with my invention;

Figure 2 is a view in end elevation, partly broken away, of the bearing shown in Figure 1; and Figure 3 is a view showing a development of the rollers as constructed and arranged in the bearing shown in Figures 1 and 2.

The bearing shown in the drawing for the purpose of illustrating my invention is of the Hart type, and comprises inner and outer hardened cylindrical bearing members or casings 1 and 2, and three annular series of bearing rollers A, B and C, disposed between and in rolling engagement with said bearing members. Of course, the number of series of rollers employed may be varied as desired. The corresponding pairs of bearing rollers 3, 3' and 4, 4' of the two outer series A and C are respectively loosely mounted on cylindrical aligning and spacing shafts or rollers 5, while the bearing rollers 6 of the intermediate series B are respectively loosely mounted on similar shafts 7. The shafts 5 and 7 are parallel to the axis of the bearing and are somewhat longer than the combined width of the series A, B and C, the extending end portions thereof being reduced. The rollers and shafts of each series respectively coact with the shafts and rollers of each adjacent series, when the bearing is assembled, to maintain the rollers of adjacent series staggered and also to maintain the rollers of each series in proper spaced relation, in the manner described in Patent No. 1,205,449 referred to above. It will be noted that the shafts of each series of rollers extend between and are in rolling engagement with the adjacent bearing rollers of each adjacent series.

A pair of flat annular rings 8 and 9 are respectively disposed adjacent the ends of the roller assembly and the respective reduced end portions of the shafts or spacing rollers 5 and 7 loosely engage openings provided therefor in said rings. Certain of the shafts 5 and 7 are peened over or otherwise provided with heads 10 at their ends, whereby the rings 8 and 9 are held in fixed relation to the roller assembly and in turn act to maintain the bearing rollers and shafts or spacing rollers of the assembly in proper relative position regardless of whether the roller assembly is or is not positioned between the cylindrical bearing members or casings 1 and 2 of the bearing.

Certain of the bearing rollers 3' and 4' of the two outermost series A and C respectively, are longer than the remaining rollers 3 and 4 respectively, while the bearing rollers 6 of the intermediate series B are preferably all of the same length. The arrangement is such that the bearing rollers are preferably maintained in assembled position with the outer ends of the rollers of the outermost series A and C respectively disposed in common planes, with each bearing roller of each series substantially in rolling end engagement with at least one roller of each adjacent series. It will thus be seen that certain of the bearing rollers of each series are axially overlapped by certain of the bearing rollers of each adjacent series, that the over-all width of the roller assembly is uniform, and that the bearing rollers of the adjacent series coact to prevent relative axial movement of any of such rollers.

It will be apparent that by reason of the axial overlapping of certain of the rollers of each pair of adjacent series, every portion of the bearing surface of each of the annular bearing members or casings 1 and 2 will be in almost continuous rolling engagement with the bearing rollers of the bearing in the operation of the latter. Accordingly, the formation of ridges on the said bearing surfaces and the disadvantages resulting therefrom are entirely prevented by my invention.

While I have shown and described a preferred embodiment of my invention, it is to be understood that such embodiment is subject to various changes and modifications without departing from the spirit of the invention and the scope of the appended claims. It is also to be distinctly understood that my invention is not limited in its application to roller bearings of the Hart type.

Having now described my invention, what I claim as new and desire to secure by Letters Patent of the United States is as follows:—

1. A roller bearing comprising a plurality of annular series of bearing rollers, and spacing rollers respectively disposed between and in rolling engagement with the adjacent bearing rollers of each series, certain of said series each having bearing rollers of different length, the rollers being assembled so as to coact to prevent substantial relative axial movement of any of the bearing rollers, and with one or more bearing rollers of each series axially overlapping one or more bearing rollers of each adjacent series.

2. In a roller bearing, a plurality of annular series of bearing rollers, and spacing rollers respectively disposed between and in rolling engagement with the adjacent bearing rollers of each series, each of the outermost series comprising bearing rollers of different length, the rollers being assembled so as to coact to prevent substantial relative axial movement of any of the bearing rollers and with certain of the bearing rollers of each series axially overlapping certain of the bearing rollers of each adjacent series.

3. In a roller bearing, a plurality of annular series of bearing rollers, and spacing rollers respectively disposed between and in rolling engagement with the adjacent bearing rollers of each series, each of the outermost series only comprising bearing rollers of different length, the rollers being assembled so as to coact to prevent substantial relative axial movement of any of the bearing rollers and with certain of the bearing rollers of each series axially overlapping certain of the bearing rollers of each adjacent series.

4. A roller bearing comprising a plurality of annular series of bearing rollers, and spacing rollers respectively disposed between and in rolling engagement with the adjacent bearing rollers of each series, each of said series having one or more bearing rollers axially overlapping one or more bearing rollers of each adjacent series.

5. A roller bearing comprising a plurality of annular series of rollers, and shafts on which the rollers of each series are respectively mounted, the shafts and rollers of each series coacting with the rollers and shafts of adjacent series to maintain the rollers of adjacent series in staggered relation, one or more rollers of each series axially overlapping one or more rollers of each adjacent series.

6. A roller bearing comprising a plurality of annular series of rollers and shafts on which the rollers of each series are respectively loosely mounted, the shafts of each series respectively extending between the adjacent rollers of each adjacent series, and certain of the rollers in each series axially overlapping certain of the rollers in each adjacent series.

7. A roller bearing comprising a plurality of annular series of rollers, and shafts on which the rollers of each series are respectively loosely mounted, the shafts of each series respectively extending between the adjacent rollers of each adjacent series, certain of said series each having rollers of different length, the rollers of the different series coacting to prevent substantial relative axial movement of any of the rollers, and one or more of the rollers of each series axially overlapping one or more rollers of each adjacent series.

8. A roller bearing comprising spaced cylindrical bearing members, a plurality of annular series of rollers disposed between said members, and shafts on which the rollers of each series are respectively mounted, the shafts and rollers of each series coacting with the rollers and shafts of adjacent series to maintain the rollers of adjacent series in staggered relation, certain of the rollers of each series axially overlapping certain of the rollers of each adjacent series, the width of the assembled series of rollers being uniform.

9. A roller bearing comprising a plurality of annular series of bearing rollers, and spacing rollers respectively disposed between and in rolling engagement with the adjacent bearing rollers of each series, each of said series having one or more bearing rollers axially overlapping one or more bearing rollers of each adjacent series, each of the bearing rollers of each series having rolling end engagement with at least one roller of each adjacent series.

10. A roller bearing comprising a plurality of annular series of rollers, and shafts on which the rollers of each series are respectively loosely mounted, the shafts of each series respectively extending between the adjacent rollers of each adjacent series, and certain of the rollers in each series axially overlapping certain of the rollers in each adjacent series, each of the bearing rollers of each series having rolling end engagement with at least one roller of each adjacent series.

11. A roller bearing comprising a plurality of annular series of bearing rollers, each of said series having one or more bearing rollers axially overlapping one or more bearing rollers of each adjacent series.

This specification signed this 24th day of August 1920.

GEORGE A. DARBY.